Figure 1:
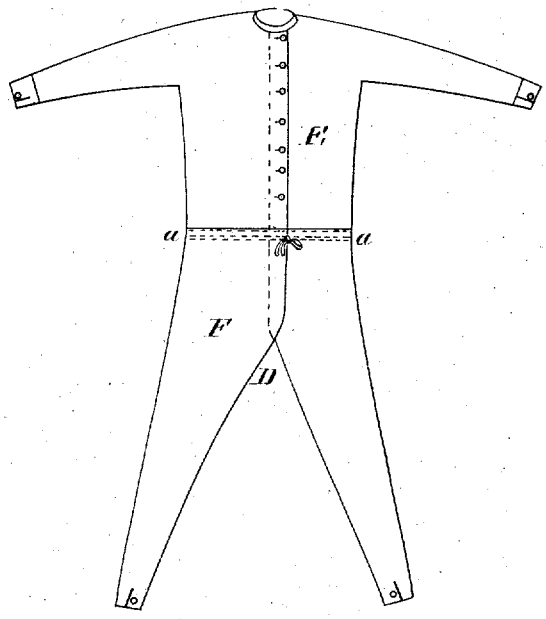

E. S. BENNETT.

Assignor by mesne assignments to G. FROST and G. H. PHELPS.

Combined Shirt and Drawers.

No. 8,068. Reissued Feb. 5, 1878.

Witnesses
George O. G. Coale
C. H. Slade

Inventor
Erastus S. Bennett
by J. E. Maynadier
his atty.

UNITED STATES PATENT OFFICE.

ERASTUS S. BENNETT, OF BROOKLYN, NEW YORK, ASSIGNOR, BY MESNE ASSIGNMENTS, TO GEORGE FROST AND GEORGE H. PHELPS, OF BOSTON, MASSACHUSETTS.

IMPROVEMENT IN COMBINED SHIRT AND DRAWERS.

Specification forming part of Letters Patent No. 83,447, dated October 27, 1868; antedated October 7, 1868; Reissue No. 8,068, dated February 5, 1878; application filed January 11, 1878.

*To all whom it may concern:*

Be it known that I, ERASTUS S. BENNETT, of the city of Brooklyn, county of Kings, and State of New York, have invented a new and useful Improvement in the Construction of Shirts and Drawers for Underwear; and I do hereby declare that the following is a full and exact description thereof, reference being had to the accompanying drawings, and the letters of reference marked thereon.

The nature of my invention consists in so constructing the shirt and drawers as to permit of their being more readily put on and taken off, more comfortably and conveniently worn, and to render them more economical and healthy than those now in vogue.

The drawing-string *a a* is supplied to remedy any inaccuracy in the fit about the waist, so that the whole weight of the garment shall not bear on the shoulders, but may be divided, a portion falling on the hips. The drawers are made open at the fork D, in the same manner that ladies' drawers are usually made, and are overlapped behind, as shown.

These shirts may be made with the usual band at the neck, or a collar may be attached, so that they may be worn as an outside shirt, if desired. The arms and legs may be the full length, or as much shorter as is desired. They may be made of any suitable material, and of any size.

Figure 2:
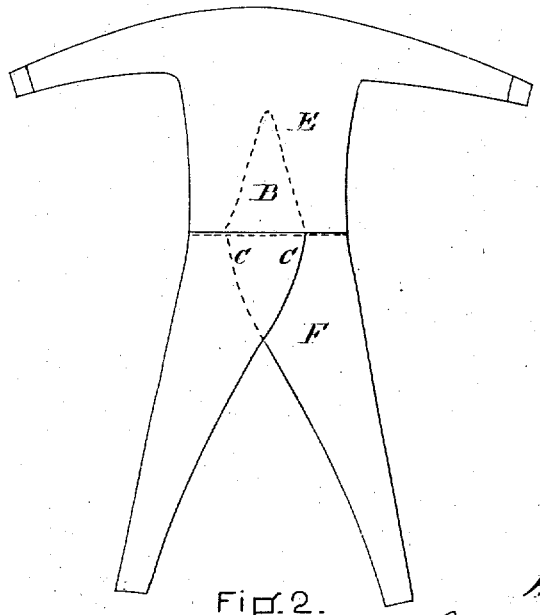

In the drawings, Figure 1 represents a front view of the hygienic shirt and drawers as they appear buttoned up. When they are to be taken off, they can be thrown off like a coat or vest, by unbuttoning the buttons in front and untying the string *a a*. Fig. 2 represents a back view of the same.

At B a piece, designed for the more perfect protection of the lumbar region, is stitched on, having the shape described by the dotted lines; or the shape may be varied to suit particular cases. Below the drawing-string *a a* a proper covering of the lower dorsal region is brought about by lapping the upper back portion of one leg on the other, as C C.

The drawers may be made fast to the shirt by means of buttons, or may be sewed, as shown in the drawings.

What I claim as my invention, and desire to secure by Letters Patent, is—

1. The combination of the shirt or body E E, open in front, and the drawers or legs F, overlapped, as shown at C C, all substantially as described.

2. In combination therewith, the drawing-string or adjuster *a a*, applied and operating substantially as described.

ERASTUS S. BENNETT.

Witnesses:

LORIN A. STALEY,

FRED. B. POTTER.